United States Patent [19]
Foster et al.

[11] 3,773,390
[45] Nov. 20, 1973

[54] WHEEL COVER

[75] Inventors: Edwin E. Foster; Thomas E. Foster, both of Austin, Tex.

[73] Assignee: Said Edwin E. Foster, by said Thomas E. Foster

[22] Filed: Dec. 27, 1971

[21] Appl. No.: 212,095

[52] U.S. Cl. .............................................. 301/37 R
[51] Int. Cl. ............................................... B60b 7/06
[58] Field of Search ............ 301/37 R, 37 B, 37 PB, 301/37 AT, 37 P

[56] References Cited
UNITED STATES PATENTS

| | | | |
|---|---|---|---|
| 3,532,385 | 10/1970 | Foster | 301/37 R |
| 2,989,345 | 6/1961 | Lyon | 301/37 B |
| 2,618,513 | 11/1952 | Horn | 301/37 R |
| 2,551,327 | 5/1951 | Horn | 301/37 R |
| 2,580,543 | 1/1952 | Henderson | 301/37 R |
| 2,631,895 | 3/1953 | Hunt | 301/37 PB |
| 1,944,945 | 1/1934 | Nehls | 70/168 |

Primary Examiner—Richard J. Johnson
Attorney—Arthur Raisch et al.

[57] ABSTRACT

A cover for a vehicle wheel having a plurality of wheel gripping spring fingers on the inner side thereof. At least one of the spring fingers is formed with an abutment engageable by a manually operable force-applying member insertable through an access opening in the cover to flex the spring finger out of engagement with the wheel to enable removal of the cover.

25 Claims, 29 Drawing Figures

PATENTED NOV 20 1973

INVENTORS
EDWIN E. FOSTER
THOMAS E. FOSTER
BY
Barnes, Kisselle, Raisch & Choate

INVENTORS
EDWIN E. FOSTER
BY THOMAS E. FOSTER

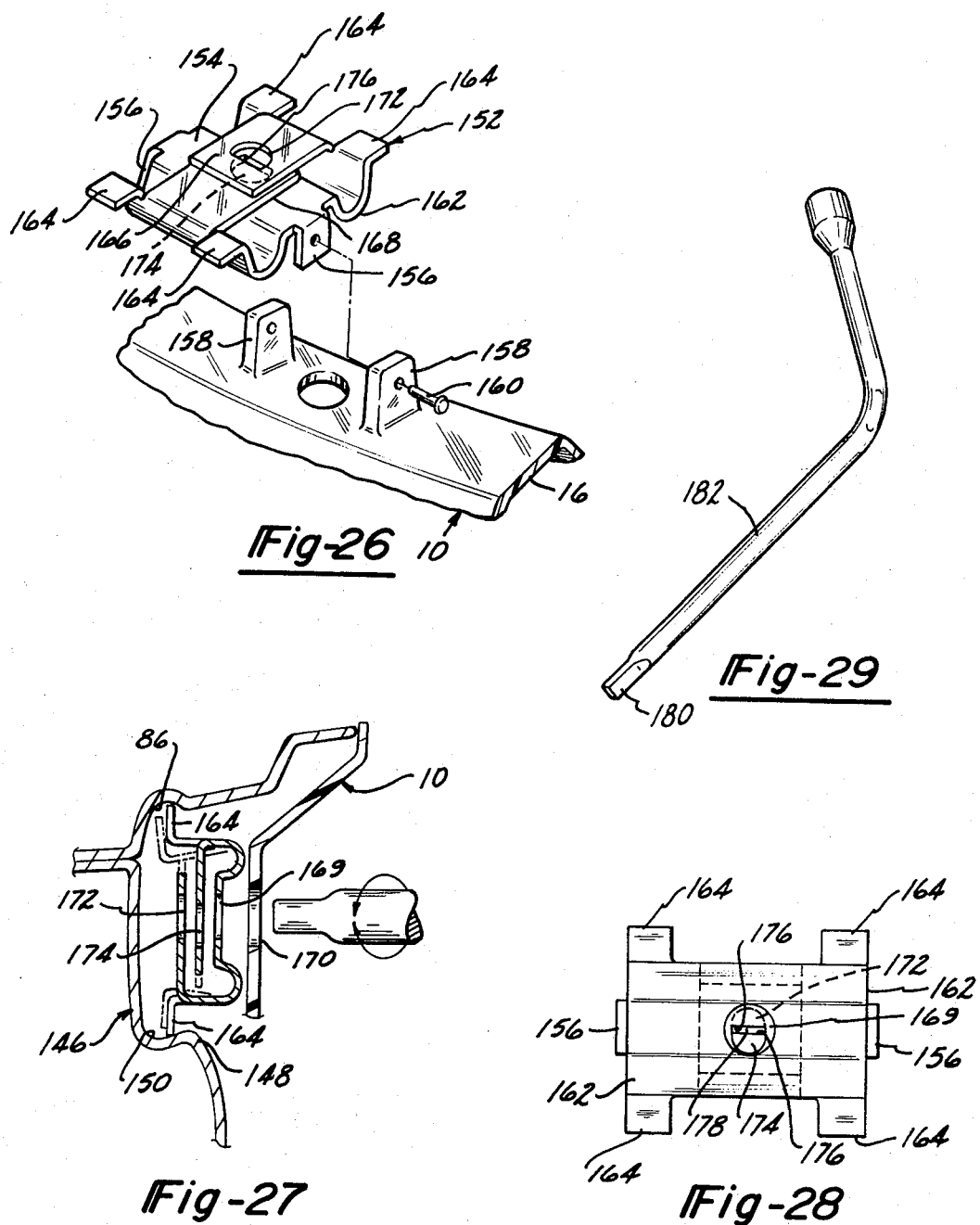

WHEEL COVER

This invention relates to vehicle wheel covers and more particularly to a novel arrangement for releasably retaining a cover on a vehicle wheel.

Conventional vehicle wheel covers normally have a plurality of sharp edged spring fingers thereon which, when the cover is applied to the wheel, flex radially inwardly to frictionally engage an annular surface on the wheel rim to retain the cover thereon. Such wheel covers are normally removed by forcibly prying the cover off the wheel. Since the sharp edges of the spring fingers tend to dig into the portion of the wheel with which they are engaged, when the cover is pried off they tend to gouge the wheel surface. For this reason the removal of such covers normally requires considerably more force than necessary to apply the wheel to the cover. Accordingly, the retention force which each spring finger is designed to exert on the wheel is limited to a large extent by the force required to pry the cover off the wheel. As a result conventional wheel covers employ many such spring fingers and positive retention of the cover on the wheel is rarely achieved.

The present invention has for its primary object the provision of retention means on a vehicle wheel cover in the form of spring fingers which are relatively few in number, which are designed to firmly and positively retain the cover on the wheel, and which at the same time enable ready removal of the cover from the wheel by the application of relatively little force.

A more specific object of the present invention resides in the provision of only a few spring fingers on the inner side of a wheel cover which are designed to be highly stressed and firmly bite into the wheel when the cover is applied to the wheel but which are arranged so that at least one of them can be radially flexed out of engagement with the wheel by a force-applying member manipulated from the outer side of the cover when it is desired to remove the cover from the wheel. Thus, in the wheel of the present invention the force with which the cover is retained on the wheel is substantially greater than the manual force required to remove the cover from the wheel because the retention force produced by the tension of the spring fingers is mechanically relieved to remove the cover from the wheel.

Other objects and advantages of the present invention will become apparent from the accompanying drawings and description, in which:

FIG. 26 is a fragmentary exploded view of a wheel cover showing a further modified form of cover retention means;

FIG. 27 is a fragmentary sectional view illustrating the manner in which the retention means shown in FIG. 26 are released;

FIG. 28 is a plan view of the retention means shown in FIG. 26;

FIG. 29 is a perspective view of the type of tool utilized for releasing the retention means shown in FIG. 27.

Figure 1:
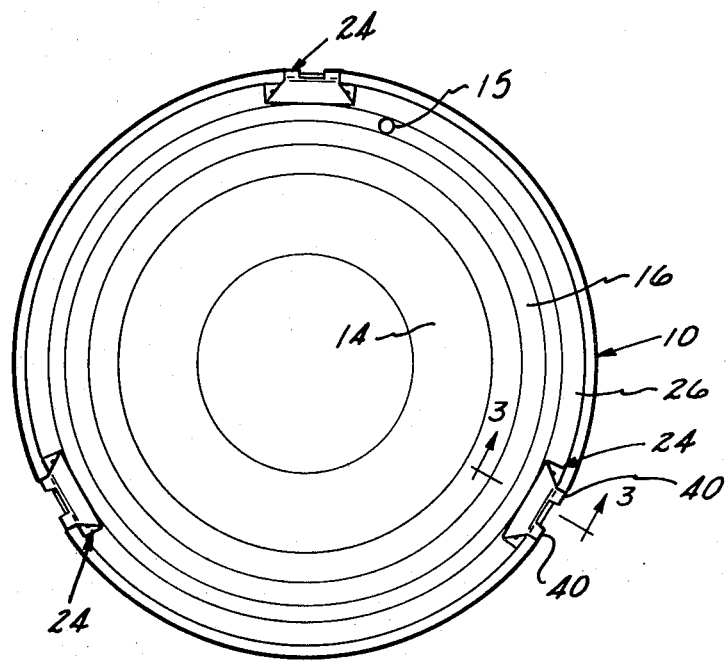
FIG. 1 is a plan view of the inner side of a wheel cover according to the present invention.
Figure 2:
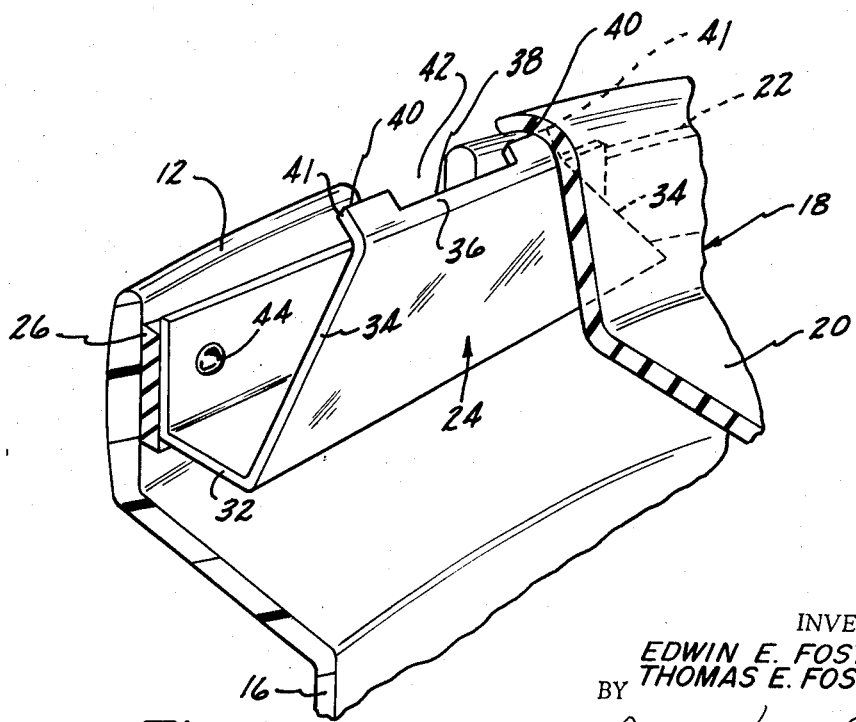
FIG. 2 is a fragmentary perspective view, partly in section, of a portion of the cover shown in FIG. 1.
Figure 3:
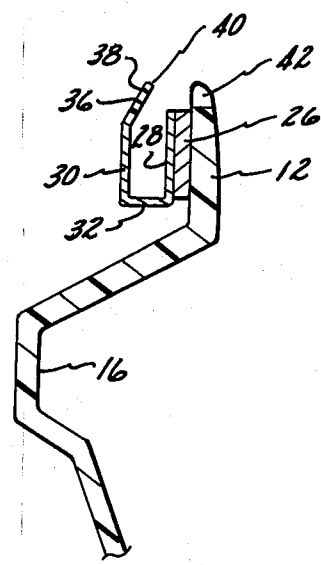
FIG. 3 is a fragmentary sectional view along line 3—3 in FIG. 1.

Referring first to FIGS. 1 through 5, the wheel cover 10 shown therein is molded from plastic and is formed with an outer peripheral flange 12 which is connected with the central body portion 14 by an inwardly dished section 16. At one portion thereof the cover is formed with an opening 15 to accommodate the valve stem on a conventional wheel. The vehicle wheel is formed with a rim 18 having a tire bead seat 20 and an axially outwardly turned tire bead retaining flange 22. In this embodiment of the invention the means for retaining the cover on the wheel are in the form of three spring fingers 24 which are equally spaced around the cover. Spring fingers 24 can be arranged so that valve stem opening 15 is adjacent one of the spring fingers. If the wheel cover is made of plastic it is normally somewhat flexible and, accordingly, is reinforced by a steel ring 26 secured to the inner face of cover flange 12 and extending continuously therearound. Each spring finger 24 is preferably formed from spring steel as a generally U-shaped member having parallel legs 28,30 connected by a return bend 32. Leg 30 has converging side edges 34 and terminates in free edge portion 36 which is inclined radially outwardly and toward the plane of flange 12. Free edge portion 36 is formed with a central notch 38 disposed between a pair of sharp wheel engaging edges 40. Wheel cover flange 12 is formed with three notches 42 around the periphery thereof which register with notches 38 in spring fingers 24. The entire assembly of spring fingers 24 and ring 26 is secured to flange 12 of the wheel cover by any suitable means, such as rivets 44.

Figure 4:
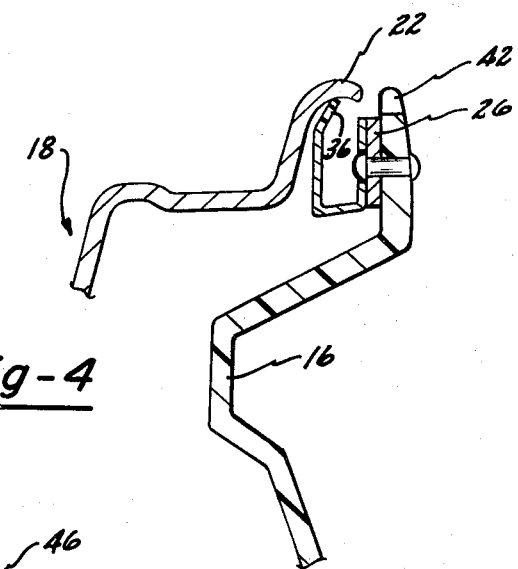
FIG. 4 is a view similar to FIG. 3 and showing the manner in which the cover retention means engages a wheel rim when the cover is applied to a wheel.
Figure 5:
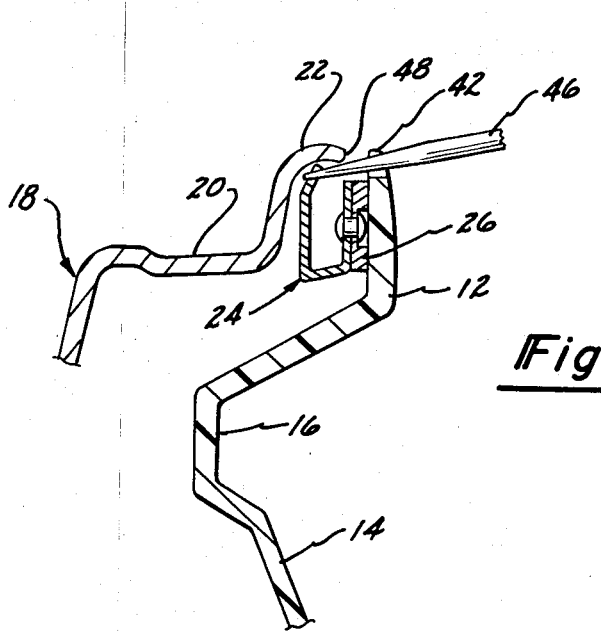
FIG. 5 is a view similar to FIG. 4 and showing the manner in which the wheel cover is removed from the wheel.
Figure 6:
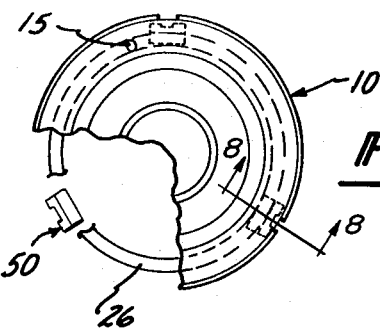
FIG. 6 is a plan view, with parts broken away, of the outer side of another form of wheel cover according to the invention.
Figure 9:
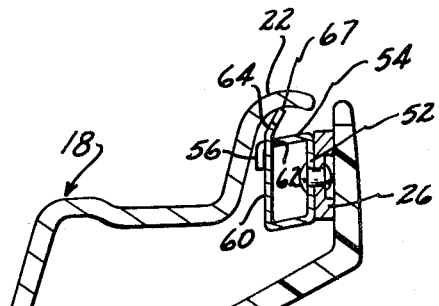
FIG. 9 is a sectional view similar to FIG. 8 and showing the manner in which the retention means engages the wheel when the cover is applied thereto.
Figure 7:
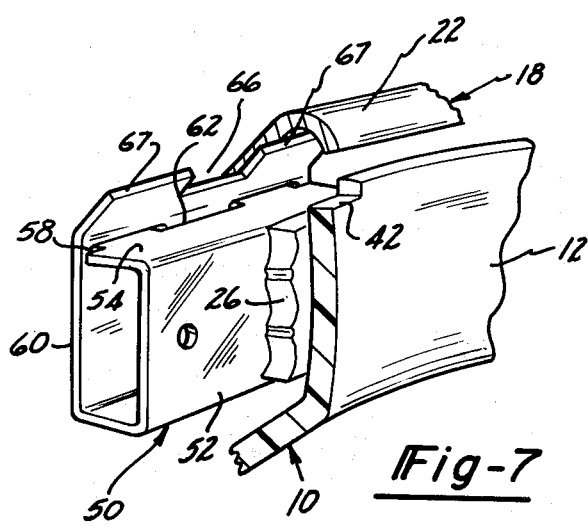
FIG. 7 is a fragmentary perspective view, partly in section, of the wheel cover shown in FIG. 6.

As shown in FIGS. 1 and 3 through 5, the wheel engaging edges 40 extend radially outwardly to approximately the outer peripheral edge of flange 12. Thus, as shown in FIG. 4, when the cover is centered over the outer face of the wheel and pressed axially inwardly thereof the inclined edge portions 36 engage a free edge of the tire bead retaining flange 22 and cause legs 28 and 30 of the spring fingers to be flexed in a generally radially inward direction. As a result the sharp edges 40 of edge portion 36, or at least the two outer corners 41 thereof, bite into the radially inner surface of flange 22 to retain the cover on the wheel. It will be appeciated that the cover may be applied to the wheel by simply engaging two of the spring fingers with flange 22 and then flexing the remaining spring finger into engagement with the flange by forcing the cover toward the wheel. Regardless of the manner in which the cover is applied to the wheel, in view of the inclination of the edge portions 36 of each spring finger and the flexed stressed condition thereof, when the cover is arranged on the wheel as shown in FIG. 4, it is apparent that any direct axial outward pull on the wheel cover will merely tend to cause the edges 40 to dig further into the radially inner surface of flange 22 on the rim. It will be further appreciated that if each of the spring fingers 24 are shaped identically and provided with the same spring characteristics the cover will be self-centering with respect to different wheels which differ somewhat in diameter.

Although the cover is not readily removable from the wheel by a direct axially outward pull on the cover as is the case with wheel covers of conventional design, it is designed to be easily removed from the wheel by simply releasing one of the springs 24. This is accomplished by merely inserting the blade end of a tire wrench, screw driver or other tool 46 through the aligned notches 42 and 38, respectively, in flange 12 and edge portion 36 and pivoting the screw driver radially outwardly in the direction indicated by the arrow in FIG. 5 with the edge 48 of flange 22 serving as a fulcrum. As the tool 46 is pivoted in the direction indicated in FIG. 5, edge portion 36 is displaced radially inwardly to disengage the biting edges 40 from the wheel rim. Continued pivotal movement of the screw driver displaces the spring finger 24 axially outwardly so that eventually the biting edges 40 clear the edge 48 of bead 22, thus releasing the tension of the other two spring fingers 24 and causing the wheel cover to become completely released from the wheel.

Even though spring fingers 24 are designed so that they require a considerable amount of force to produce flexing thereof, the inclined edge portions 36 serve as cam surfaces which facilitate and minimize the amount of force required to apply the cover to the wheel. Thus, once the cover is applied to the wheel the retention force is designed to be relatively high. Nevertheless, since it requires the release of only one spring finger to remove the cover from the wheel the amount of force required to be applied by tool 46 to remove the cover is relatively small in relation to the retention force.

The form of retention means illustrated in FIGS. 6 through 10 differs only slightly from those previously described in that the spring fingers 50 are rectangularly shaped in cross section rather than generally U-shaped. In this arrangement leg 52 of each spring finger which is secured to reinforcing ring 26 has its free end portion extended as a strut 54 which is formed with a pair of lugs 56 extending through openings 58 and then bent over the opposite leg 60. Lugs 56 limit the extent of separation between legs 52 and 60 and the shoulder 62 on strut 54 limit the extent to which legs 52 and 60 can flex toward one another. The extension 64 of leg 60 is notched as at 66 between the free biting edges 67.

Figure 8:
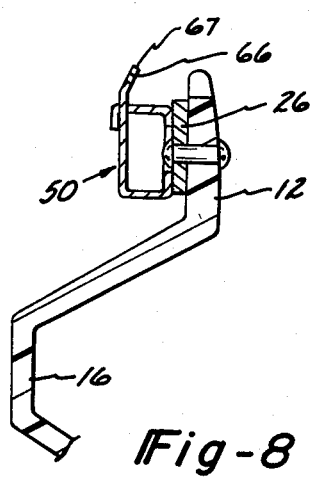
FIG. 8 is a fragmentary sectional view along line 8—8 in FIG. 6.

The unstressed condition of each spring finger 50 is illustrated in FIG. 8 herein it is observed that the spring finger is of generally rectangular cross section. When the wheel cover 10 with spring fingers 50 secured thereto is applied to a wheel by pressing axially against the wheel, the inclined extension 64 of leg 60 acts as a cam to flex the spring finger into the parallelogram shape shown in FIG. 9. Shoulders 62 prevent legs 60 from simply flexing axially towards legs 52 and constrain flexing of the spring fingers to a generally radially inward direction. Thus the spring fingers are highly stressed in a radial direction and produce high retention forces.

Figure 10:
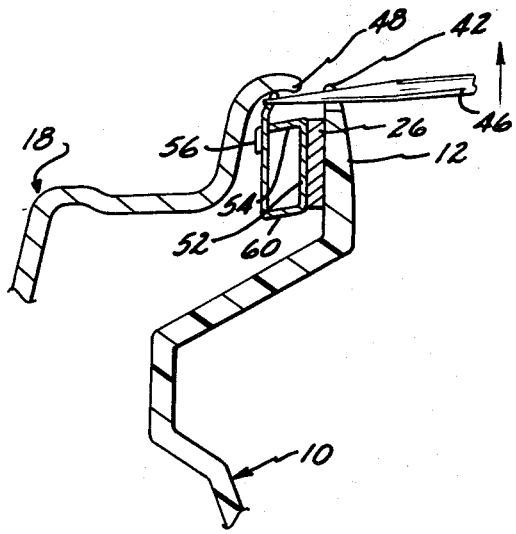
FIG. 10 is a view similar to FIG. 9 and illustrating the manner in which the cover is removed from the wheel.

When it is desired to remove the cover, tool 46 is inserted into the aligned notches 42 and 66 and pivoted about the fulcrum point 48 on the rim in the manner illustrated in FIG. 10 to further flex the spring finger radially inwardly to disengage the biting edges 67 of extension 64 from the turned over flange 22 of the wheel rim. Thus with the arrangement shown in FIGS. 6 through 10 flexing of the spring fingers is limited generally to a radially inward direction both upon application and removal of the cover as distinguished from the arrangement shown in FIGS. 1 through 5 where leg 30 of the spring finger has a tendency to flex in directions both radially and axially of the wheel cover, particularly when the cover is applied to the wheel.

The retention arrangement of the embodiment shown in FIGS. 11 through 15 includes three spring fingers, two of which (designated 68) differ slightly from the third (designated 70). Each of the spring fingers includes a base leg 72 by means of which the spring finger is mounted on ring 26 and cover 10 and a radially outwardly and axially inwardly inclined leg 74. Each of the legs 74 is extended radially outwardly as at 76 and is then inclined radially and axially outwardly as at 78 to form wheel engaging free edges 80. Spring finger 70 differs from spring fingers 68 in that it is further provided with a tab 83 which is inclined radially inwardly and axially outwardly from the portion 78 between the free edges 80. Tab 82 is formed with a central opening 84.

In this arrangement it will be observed that the free edges 80 of the spring fingers are disposed axially inwardly of the peripheral flange 12 of the wheel cover to a much greater extent than in the previous embodiments described. In this arrangement the free edges 80, and specifically the two outer corners thereof, are adapted to engage and bite into the safety groove 86 of the wheel rim which is located axially inwardly of and adjacent the tire bead seat 20. Accordingly, adjacent spring finger 70 wheel cover 10 is provided with a circumferentially registering opening 88 to accommodate a cover removal tool 90. Tool 90 is fashioned with a shank 92 of suitable configuration which adjacent its end is bent as at 94 and provided with a reduced free end portion 96 of a size to fit into the opening 84 of tab 82. Except for the provision of tab 82, each of the spring fingers 68,70 are of substantially the same configuration and spring characteristics.

Figure 11:
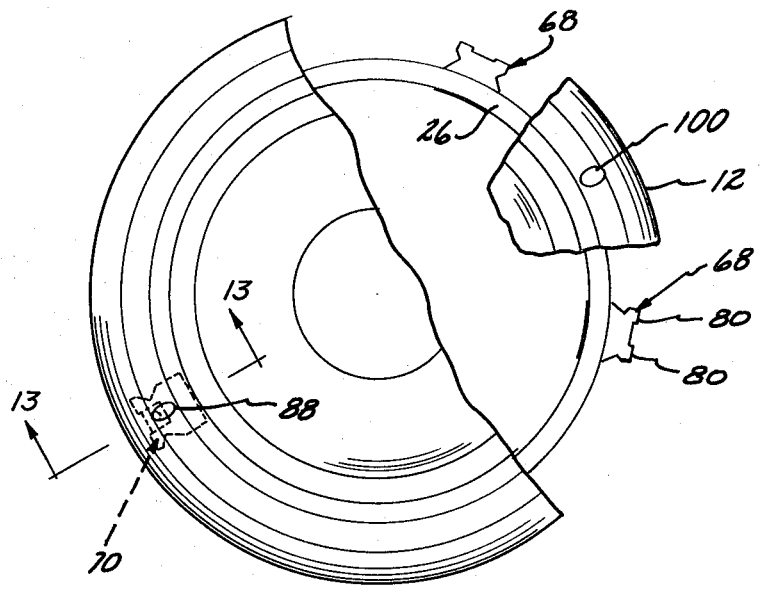
FIG. 11 is a plan view, with parts broken away, of the outer face of another form of wheel cover according to the present invention.
Figure 12:
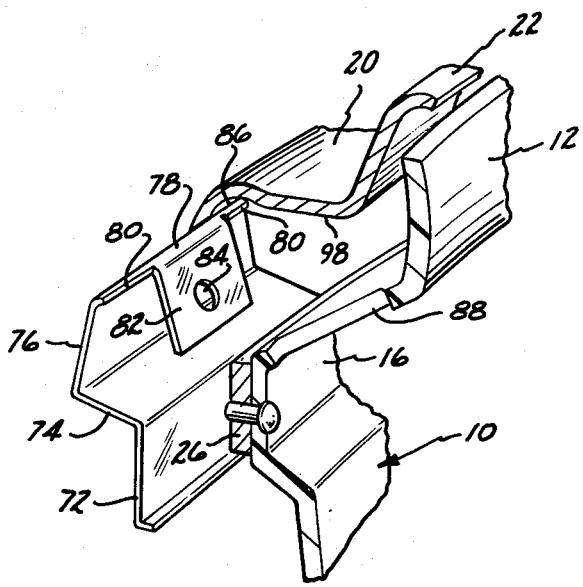
FIG. 12 is a fragmentary view, partly in section, of the wheel cover shown in FIG. 11.
Figure 13:
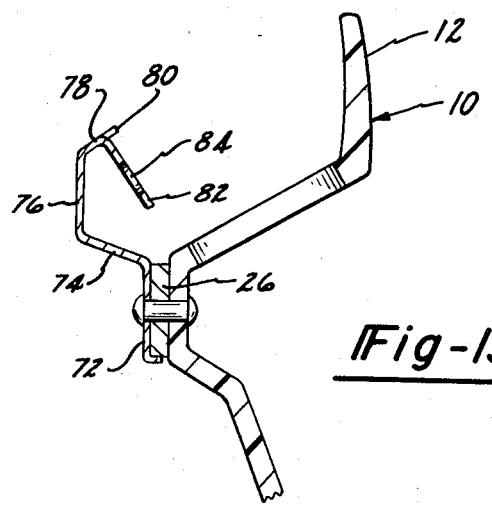
FIG. 13 is a fragmentary sectional view along line 13—13 in FIG. 11.
Figure 14:
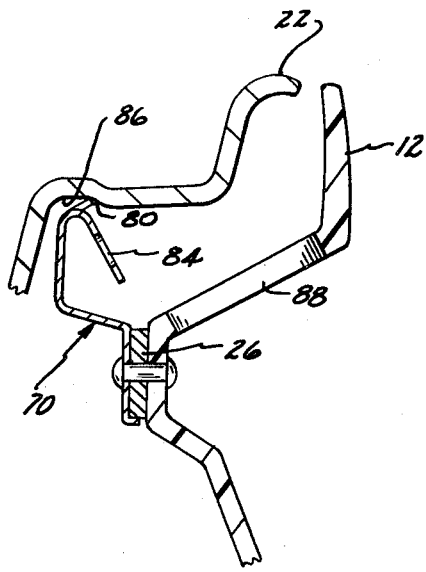
FIG. 14 is a view similar to FIG. 13 and showing the manner in which the retention means engage the wheel rim when the cover is applied thereto.

The cover may be applied to the wheel by initially inclining it slightly to the plane of the wheel so as to interengage the biting edges 80 of the two spring fingers 68 with the safety groove 86 and thereafter pressing the portion of the cover adjacent spring finger 70 inwardly to engage the outer corners of biting edges 80 of spring finger 70 with the safety groove. When the cover is pushed axially inwardly, the inclined portion 78 of spring finger 70 engages the wheel rim at the annular shoulder 98 (FIG. 15) and functions as a cam to flex leg 74 in a generally radially inward direction as the free edges 80 slide past the radially inner surface of tire bead seat 20. In the meantime legs 74 of the other two spring fingers 68 are simultaneously flexing. However, as the free edges 80 of spring finger 70 move into the safety groove 86, legs 74 of all three spring fingers flex radially outwardly to a slight extent so that the cover is firmly retained on the wheel by a biting action of the free edges 80 in the safety groove 86.

Where the spring fingers are designed to engage the safety groove 86 the two spring fingers 68 are located closer to one another than they are to spring finger 70. Thus, as shown in FIG. 11, spring fingers 68 are spaced apart approximately 60° and located symmetrically with respect to a diameter passing through spring finger 70. The location of spring fingers 68 in this fashion tends to prevent interference between the free edge of flange 12 of the wheel cover and the outwardly turned flange 22 of the wheel rim when the cover is initially inclined to the plane of the wheel. Since all the springs are of the same configuration and have the same spring characteristics, the cover automatically centers itself with respect to the axis of the wheel when it is applied thereto. This is important since wheels of nominally the same size may vary considerably in diameter from one another because of manufacturing tolerances. Likewise, in order to minimize interference between the valve stem on the wheel and the cover the valve stem opening 100, the valve stem opening on the cover is preferably located diametrically opposite spring finger 70.

Figure 15:
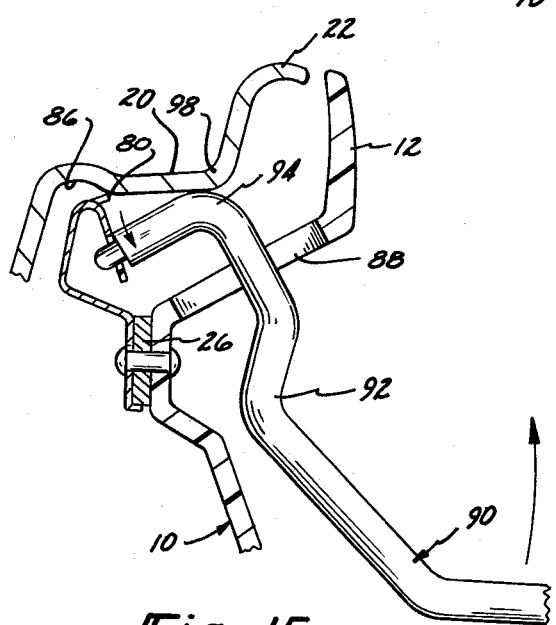
FIG. 15 is a view similar to FIG. 14 and showing the manner of removal of the cover from the wheel.

To remove the wheel cover from the wheel the end of tool 90 is inserted through opening 88 in the wheel cover and the reduced end portion 96 is engaged in the opening 84 in tab 82. Thereafter tool 90 is pivoted in a radially outward direction as shown in FIG. 15 so that the bent portion 94 acts as a fulcrum against the tire bead seat 20. Continued outward movement of the handle of the tool 90 causes tab 82 together with legs 72,74 to be flexed in a generally radially inward direction so as to disengage the biting edges 80 of spring finger 70 from within safety groove 86. When this occurs the wheel cover automatically releases itself from the wheel rim.

In the embodiment illustrated in FIGS. 16 through 22 wheel cover 10 is formed with a plurality of circumferentially spaced bosses 102 on the inner side thereof (FIG. 21) so that the reinforcing ring 26 is spaced inwardly from the inwardly dished section 16 of the wheel cover. Three spring fingers are mounted on reinforcing ring 26, two of which are designated 104 and the third is designated 106. Each spring finger has a base portion 108 seated on reinforcing ring 26 and radially outwardly extending legs 110, 112 and 114. Leg 114 is formed with a free rim engaging edge 116. Spring finger 106 differs from spring fingers 104 merely by the extension of leg 114 radially inwardly as at 118 so that extension 118 lies between reinforcing ring 26 and the inner face of the wheel cover at the inwardly dished portion 16 thereof. Extension 118 is reinforced by a pair of axially inwardly bent flanges 120 along opposite sides thereof.

Figure 16:
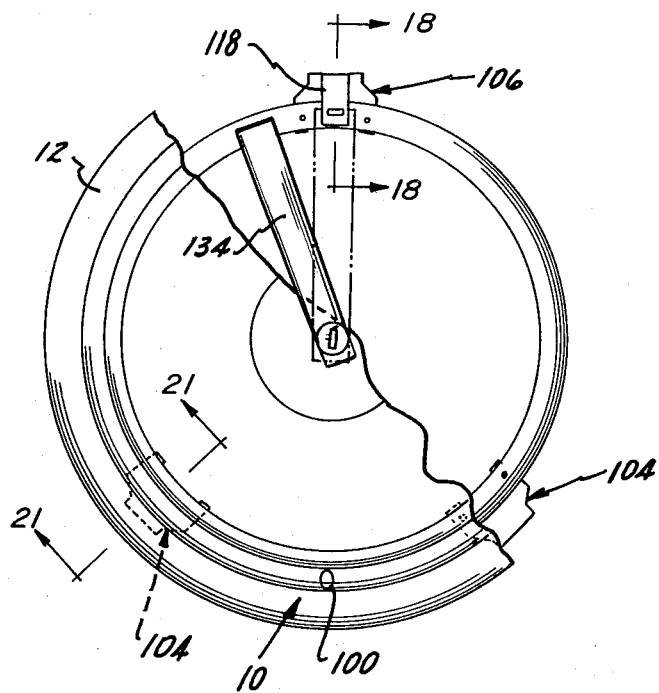
FIG. 16 is a plan view, with parts broken away, of another wheel cover according to the present invention.
Figure 17:
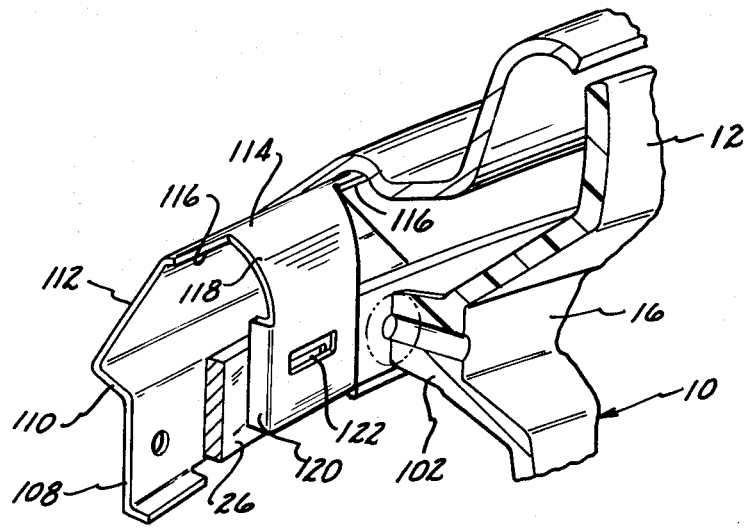
FIG. 17 is a fragmentary perspective view, partly in section, of a portion of the wheel cover shown in FIG. 16.
Figure 18:
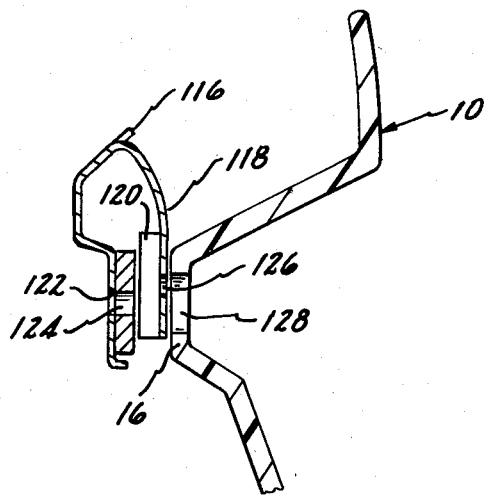
FIG. 18 is a fragmentary sectional view along line 18—18 in FIG. 16.
Figure 19:
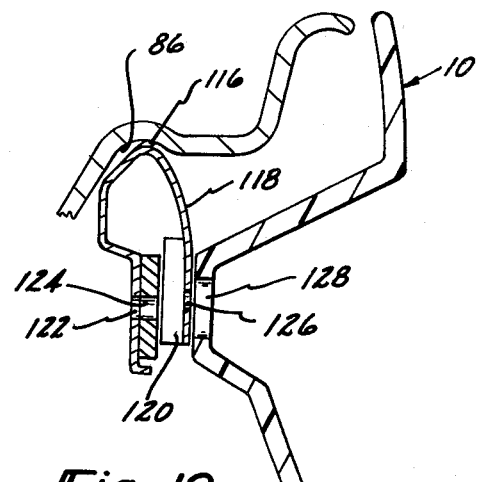
FIG. 19 is a view similar to FIG. 18 and showing the manner in which the retention means engage the wheel rim when the cover is applied thereto.

Registering apertures 122 and 124 of rectangular shape are formed in the base portion 108 of spring finger 106 and reinforcing ring 26. Likewise, rectangular aperture 126 is formed in extension 118 which registers with apertures 122 and 124 in a direction circumferentially of the cover but has its center displaced slightly radially outwardly of apertures 122,124 so that it only partially overlaps the latter. The dished portion 16 of the cover 10 is also formed with a larger aperture 128 which generally registers with openings 122, 124 and 126. As in the previous embodiment described, spring fingers 104 are disposed circumferentially closer to one another as shown in FIG. 16 than they are to spring finger 106 and the valve stem opening 100 is located diametrically opposite spring finger 106.

The cover is preferably applied to the wheel by initially engaging the biting edges 116 of spring fingers 104 with safety groove 86 and thereafter pressing the portion of the wheel cover on which spring finger 106 is mounted axially inwardly to interengage the free biting edges 116 of spring finger 106 with the safety groove. In any event, when the cover is applied to the wheel, legs 110,112,114 of each spring finger is in a flexed stressed condition so that the outer corners of biting edges 116 firmly engage within the safety groove 86 on the wheel rim to firmly retain the cover on the wheel.

Figure 20:
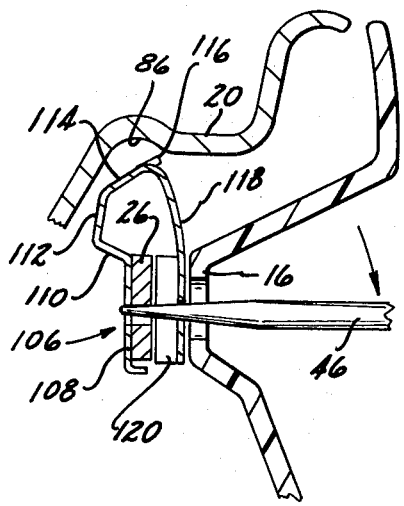
FIG. 20 is a view similar to FIG. 19 and showing the manner in which the cover is removed from the wheel.
Figure 21:
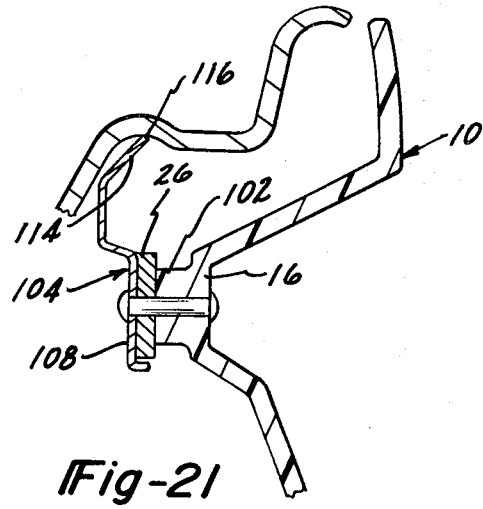
FIG. 21 is a fragmentary sectional view aling line 21—21 in FIG. 16.
Figure 22:
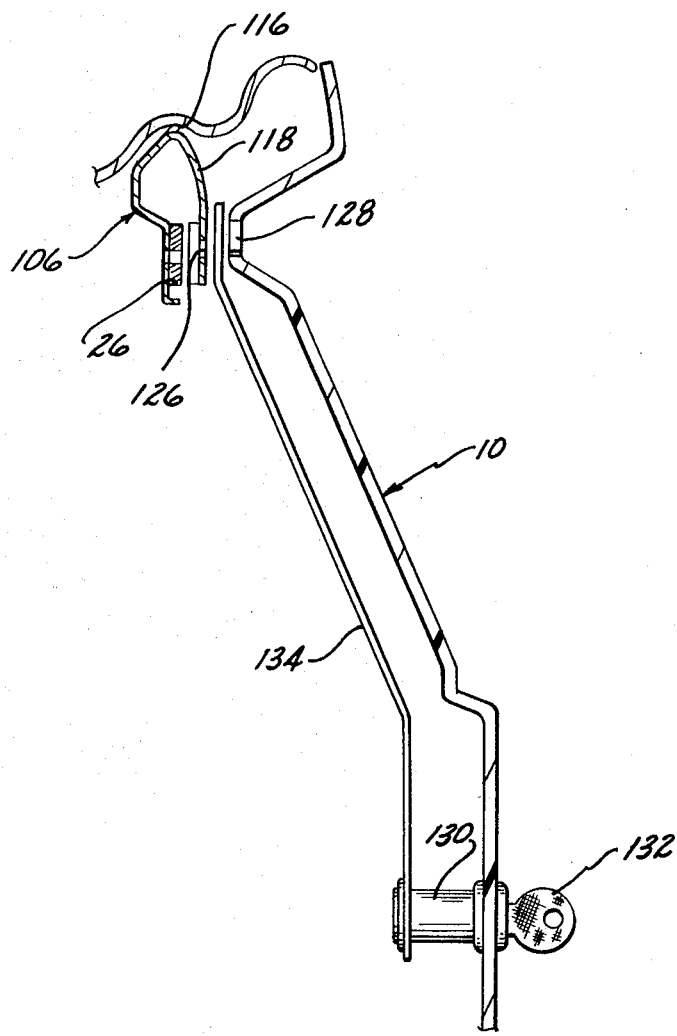
FIG. 22 is a view similar to FIG. 19 and showing a locking bar for preventing unauthorized removal of the cover from the wheel.

To remove the cover it is merely necessary to insert the blade end of tool 46 into the registering portions of openings 122, 124, 126 and 128 and pivot the tool radially inwardly as shown in FIG. 20 so that the end of the tool fulcrums about the opening 124 in reinforcing ring 26. Since opening 126 is initially located radially inwardly of openings 122,124 the radial inward pivoting movement of tool 46 causes extension 118 to be displaced radially inwardly to thus disengage the biting edges 116 of spring finger 106 from within the safety groove. When these biting edges clear the tire bead seat 20 the wheel cover is automatically released from the wheel.

If it is desired to prevent unauthorized removal of the wheel cover this can be accomplished in the arrangement shown in FIGS. 16 through 22 by simply providing a cylinder lock 130 on the inside of the cover which is arranged to be operated by a key 132 from the outer side of the cover. An arm 134 is connected to cylinder lock 130 so that in response to rotation of key 132 arm 134 can be pivoted from the position indicated by solid lines in FIG. 16 where the free end thereof is circumferentially offset from extension 118 to the position shown in broken lines in FIG. 16 where the free end is disposed between opening 128 in the cover and opening 126 in extension 118. In the latter position arm 134 prevents the insertion of a tool into opening 126,124,122 and thus prevents retraction of the biting edges 116 of spring finger 106 to release the cover from the wheel.

Figure 23:
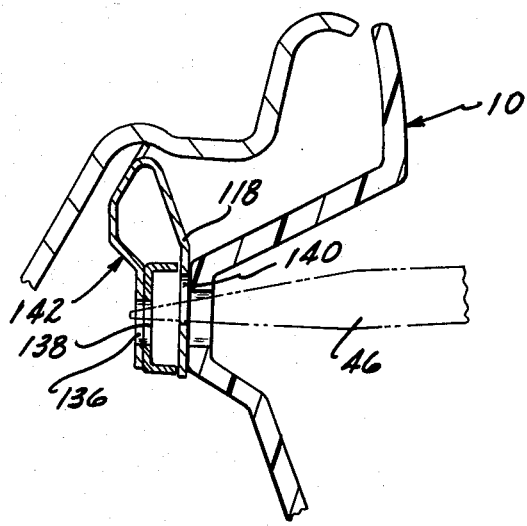
FIG. 23 is a view similar to FIG. 19 and illustrating a modified form of cover retention means.
Figure 24:
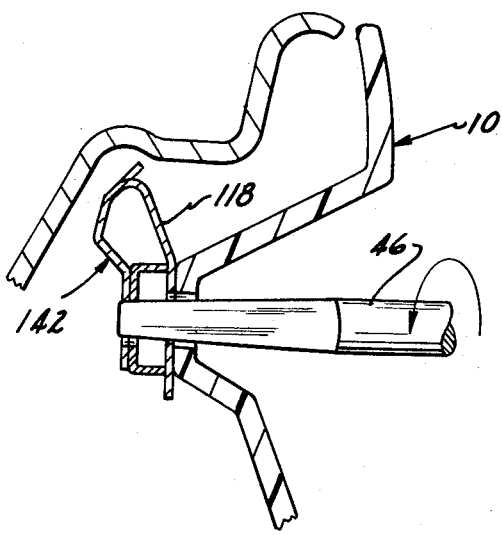
FIG. 24 illustrates the manner in which the retention means illustrated in FIG. 23 are flexed to remove the cover from the wheel.
Figure 25:
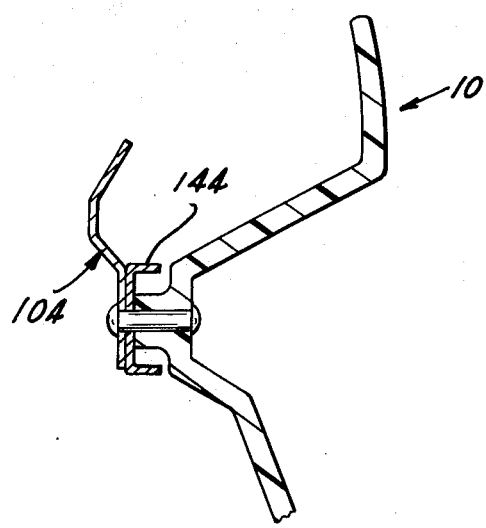
FIG. 25 is a fragmentary sectional view showing the spring finger construction also used with the arrangement illustrated in FIG. 23.

The arrangement illustrated in FIGS. 23 through 25 is generally the same as that shown in FIGS. 18 through 21. However, in the embodiment illustrated in FIGS. 23 through 25 the openings 136,138, 140 are round as compared to the corresponding rectangular openings 122,124,126 in the embodiment illustrated in FIGS. 18 through 21. By reason of this modification extension 118 of the retractable spring finger 142 is adapted to be displaced radially inwardly by simply rotating tool 46 rather than pivoting it radially inwardly in the manner illustrated in FIG. 20. In other respects the retention means shown in FIGS. 23 through 25 are generally the same as that shown in FIGS. 18 through 21 except that the reinforcing ring 144 is formed from sheet metal with a U-shaped cross section rather than from a solid metal bar.

In the arrangement shown in FIGS. 26 through 29 the wheel rim is formed with the conventional safety groove 86 and the wheel body 146 is fashioned with a plurality of radial bumps 148 which define a groove 150 lying generally in the same radial plane as safety groove 86. Bumps 148 are usually formed on a wheel body to accommodate a hub cap which covers only the central portion of the wheel body. The retention means in this arrangement comprises a plurality of spring fingers 152 (at least two or possibly four in number, depending upon the number of bumps 148 provided on the wheel body). Each spring finger has the configuration shown in FIGS. 26 and includes a central base portion 154 having ears 156 bent perpendicular thereto at each end thereof. Ears 156 are spaced apart to interfit between lugs 158 formed on the inner side of the dished portion 16 of the wheel cover and the spring finger is mounted thereon by means of rivets or the like 160. On the radially opposite sides of base portion 154 each spring finger is formed with a U-shaped spring portion 162 having lugs 164 extending radially thereof. Four such lugs 164 are provided, one at each corner of the spring finger. Intermediate each set of lugs 164 the spring finger is fashioned with inwardly bent tabs 166 and 168, the ends of which overlie each other and also overlie the central base portion 154. Base portion 154 is formed with a central opening 169. Between lugs 158 the dished portion 16 of the wheel cover the cover is formed with a central aperture 170 and tabs 166,168 are also provided with apertures 172 and 174. The latter apertures have straight sides 176 at adjacent portions thereof so that in the normal position of the spring portions 162 the registering portions of openings 172 and 174 present through openings 169 and 170 an elongated rectangular slot 178 as shown in FIG. 28.

Each spring finger 152 is dimensioned and located on the wheel so that in the normal unstressed condition thereof the distance between the free edges of the opposed lugs 164 is slightly greater than the radial distance between safety groove 86 and groove 150. To engage the cover with the wheel the cover is placed against the outer face of the wheel and the flattened end portion 180 of a tool such as a tire wrench 182 is inserted through opening 170 and into the elongated slot 178 defined by the overlapping portions of openings 174 and 172. The tire wrench is then rotated to draw the opposed lugs 164 toward each other as shown in broken lines in FIG. 27. Thereafter wrench 182 is rotated back to its original position to permit the outer free edges of lugs to flex outwardly into engagement with safety groove 86 and groove 150 as shown in solid lines in FIG. 27. Each of the spring fingers is manipulated in this fashion to secure the cover on the wheel. When the spring fingers are manipulated in this manner and released to the position shown in solid lines in FIG. 27, spring portions 162 are still stressed to a high degree and cause the radially outer edges of lugs 164 to bite firmly into the metal surfaces defining safety groove 86 and groove 150. The wheel cover can be removed from the wheel by reversing the above described operation; namely, first retracting lugs 164 toward one another to the position shown in broken lines in FIG. 27 and then withdrawing the cover outwardly from the wheel.

Thus, it will be seen that I have provided a wheel cover retention arrangement which can be utilized for either plastic wheel covers or wheel covers formed of metal. The provision of wheel gripping members in the form of spring fingers which can be flexed out of engagement with the wheel by means of a manually manipulated tool enables me to employ a minimum of wheel gripping elements, each designed to exert a relatively high retention force on the wheel. Furthermore, since the wheel gripping elements need not be more than three or four in number, they can be designed to engage the wheel rim at the outer edge thereof without unduly interfering with the placement of conventional wheel balancing weights on the wheel.

We claim:

1. A cover in combination with a vehicle wheel of the type having a wheel body and a tire mounting rim, said wheel having a generally radially facing annular surface on the outer face thereof concentric with the wheel axis, said cover having a body portion adapted to overlie said annular surface when the cover is applied to the outer face of the wheel, said wheel cover having an access opening therethrough adapted to accommodate a force applying member, a plurality of wheel engaging members, means mounting said wheel engaging members on the inner face of the cover in circumferentially spaced relation and concentric with the center thereof, each of said wheel engaging members having wheel engaging portions adapted to frictionally engage and grip said annular surface to retain the cover on the wheel, at least one of said wheel engaging members being spaced circumferentially from the next adjacent wheel engaging members on circumferentially opposite sides thereof through an arc of at least about 90°, said one wheel engaging member being axially aligned with said access opening and comprising a spring finger having a radially projecting wheel gripping edge portion thereon, said spring finger being displaceable radially in one direction to bias said wheel gripping edge portion into firm frictional engagement with said annular surface, said spring finger being radially retractable in the opposite direction to disengage its wheel gripping edge portion from said annular surface and means on said spring finger forming an abutment thereon which is spaced radially from said edge portion, said abutment being engageable by a manually operable force applying member extending through the access opening from the outer face of the cover for radially displacing said spring finger whereby to enable the cover to be secured to or removed from the wheel by manipulating said member from the outer side of the cover to apply a radial force to said abutment, said spring finger having one end fixed relative to the cover and the opposite end portion extending radially inwardly relative to said free edge portion, said abutment being formed on said radially inwardly extending end portion and the access opening in the cover being spaced radially inwardly of the outer periphery of the cover, said abutment comprising the edge of an opening in said radially inwardly extending end portion.

2. The combination called for in claim 1 wherein said last-mentioned opening registers axially with said access opening.

3. A cover in combination with a vehicle wheel of the type having a wheel body and a tire mounting rim, said wheel having a generally radially facing annular surface on the outer face thereof concentric with the wheel axis, said cover having a body portion adapted to overlie said annular surface when the cover is applied to the outer face of the wheel, said wheel cover having an access opening therethrough adapted to accommodate a force applying member, a plurality of wheel engaging members, means mounting said wheel engaging members on the inner face of the cover in circumferentially spaced relation and concentric with the center thereof, each of said wheel engaging members having wheel engaging portions adapted to frictionally engage and grip said annular surface to retain the cover on the wheel, at least one of said wheel engaging members being spaced circumferentially from the next adjacent wheel engaging members on circumferentially opposite sides thereof through an arc of at least about 90°, said one wheel engaging member being axially aligned with said access opening and comprising a spring finger having a radially projecting wheel gripping edge portion thereon, said spring finger being displaceable radially in one direction to bias said wheel gripping edge portion into firm frictional engagement with said annular surface, said spring finger being radially retractable in the opposite direction to disengage its wheel gripping edge portion from said annular surface and means on said spring finger forming an abutment thereon which is spaced radially from said edge portion, said abutment being engageable by a manually operable force applying member extending through the access opening from the outer face of the cover for radially displacing said spring finger whereby to enable the cover to be secured to or removed from the wheel by manipulating said member from the outer side of the cover to apply a radial force to said abutment, said spring finger having one end fixed relative to the cover and the opposite end portion extending radially inwardly relative to said free edge portion, said abutment being formed on said radially inwardly extending end portion and the access opening in the cover being spaced radially inwardly of the outer periphery of the cover, said spring finger comprising a pair of axially spaced spring legs integrally connected by a return bent portion, one of said legs being fixed to the rear face of the cover and the other being radially displaceable by flexing said return bent portion, each of said legs having an opening therein, the last-mentioned openings having axially overlapping portions registering with said access opening, said abutment being defined by an edge portion of the opening in the radially displaceable leg.

4. The combination called for in claim 3 wherein said two openings have portions which are offset radially relative to each other and the access opening in the cover is larger than the registering portions of said two openings to enable insertion of a force applying member through said access opening and into the registering portions of said other two openings and manipulation of the force-applying member to shift the displaceable leg in a radially inward direction to retract said free edge portion of said spring finger out of engagement with said annular surface.

5. A cover in combination with a vehicle wheel of the type having a wheel body and a tire mounting rim, said wheel having a generally radially inwardly facing annular surface on the outer face thereof concentric with the wheel axis, said cover having a body portion adapted to overlie said annular surface when the cover is applied to the outer face of the wheel, said wheel cover having an access opening therethrough spaced radially inwardly from the outer periphery of the cover and adapted to accommodate a force applying member extending therethrough from the outer side of the cover, a plurality of wheel engaging members, means mounting said wheel engaging members on the inner face of the cover in circumferentially spaced relation and concentric with the center thereof, each of said wheel engaging members having wheel engaging portions adapted to frictionally engage and grip said annular surface for retaining the cover on the wheel against axial and circumferential displacement, at least one of said wheel engaging members being spaced circumferentially from the next adjacent wheel engaging members on circumferentially opposite sides thereof through an arc of greater than 90°, said one wheel engaging member being radially aligned with said access opening and comprising a spring finger, said spring finger having three portions comprising a resiliently flexible, radially outwardly extending first portion connected to the cover and flexible relative thereto, a second portion comprising a wheel gripping edge portion at the radially outer end of said first portion adapted to frictionally engage and grip said annular surface and a third portion extending from said first portion and forming a radially inwardly extending tab terminating in a free radially inner end, said tab having means thereon extending in a plane generally transversely of the plane of the tab and forming a radially outwardly facing abutment on the tab engageable by a force applying member extending through said opening from the outer side of the cover for applying to said abutment means and said tab a force having a substantial radially inward component, said spring finger being normally beiased in a radially outward direction by said resiliently flexible first portion to bias the wheel gripping edge portion thereof into firm frictional engagement with said annular surface, said first portion of said spring finger being resiliently flexed by the force applied to said abutment means by said force applying member to disengage and displace said wheel gripping edge portion radially inwardly from said annular surface and thereby release the cover from the wheel.

6. The combination called for in claim 5 wherein each of said wheel engaging members comprises a radially flexible spring finger having a radially projecting, wheel-gripping edge portion thereon.

7. The combination called for in claim 5 wherein the cover is formed of a material having a tendency to distort when subjected to the radial forces produced with interengagement of said edge portion ith said annular surface and said mounting means includes a separate rigid reinforcing member mounted on the inner face of the cover, said wheel-engaging members being mounted on said rigid member to prevent distortion of the cover.

8. The combination called for in claim 5 wherein said rim includes a generally cylindrical tire bead seat, said annular surface comprising a radially inwardly facing groove disposed axially inwardly of said tire bead seat.

9. The combination called for in claim 5 wherein said access opening overlies said radially inwardly extending tab.

10. The combination called for in claim 5 wherein said radially inwardly extending tab is disposed axially closer to the rear face of the cover than said wheel gripping edge portion of the spring finger.

11. The combination called for in claim 5 including key-operated means on the cover for blocking said access opening to prevent insertion of a force-applying means therethrough into engagement with said abutment means.

12. The combination called for in claim 5 wherein said abutment means is spaced axially inwardly from the inner side of the wheel cover and including key-operated means mounted on the inner side of the wheel cover and displaceable to a position underlying said access opening to prevent insertion of a force-applying member therethrough.

13. The combination called for in claim 5 wherein the remaining wheel-engaging members also comprise spring fingers which have generally the same spring characteristics as said one spring finger.

14. The combination called for in claim 13 including a substantially rigid reinforcing member separate from the wheel cover and mounted on the inner face of the cover, all of said wheel-engaging members being mounted on said reinforcing member.

15. The combination called for in claim 1 wherein the wheel engaging edge portion of said spring finger is inclined axially outward in a radially outward direction.

16. The combination called for in claim 5 wherein each of said wheel engaging members comprises a radially flexible spring finger having a wheel-gripping edge portion, the wheel-gripping edge portions of each of said spring fingers being inclined axially outward in a radially outward direction.

17. The combination called for in claim 5 wherein said wheel engaging edge portion is disposed intermediate said first and third portion of the spring finger.

18. The combination called for in claim 5 wherein said access opening is generally axially aligned with said abutment means.

19. The combination called for in claim 5 wherein said abutment means comprises the edge of an opening in said tab.

20. The combination called for in claim 5 wherein said abutment means comprises a shoulder on the tab perpendicular to the plane of the tab.

21. The combination called for in claim 5 wherein said first and third portions of said spring finger comprise a pair of axially spaced, overlying spring legs, said abutment means comprising an opening through one of said spring legs, the other spring leg also having an opening therein, said last-mentioned openings having axially overlapping portions registering with said access opening.

22. The combination called for in claim 5 including means on the spring finger forming a second abutment spaced axially from the first abutment means on the tab and with which a force applying member is engageable to apply said radially inward force to said first abutment means.

23. The combination called for in claim 22 wherein said second abutment means comprises an opening in said spring finger.

24. The combination called for in claim 22 including a substantially rigid reinforcing member mounted on the inner face of the cover, said second abutment means being located on said reinforcing member.

25. The combination called for in claim 24 wherein said second abutment means comprises an edge portion of an opening in said reinforcing member.

* * * * *